United States Patent
Tanaka et al.

(10) Patent No.: US 6,385,387 B1
(45) Date of Patent: *May 7, 2002

(54) DIGITAL VIDEO DISC ITS RECORDING AND REPRODUCING METHODS AND RELATED ENCODER AND DECODER USING THE SAME

(75) Inventors: Yoshiaki Tanaka; Shoji Ueno, both of Fujisawa (JP)

(73) Assignee: Victor Company of Japan, Ltd., Yokohama (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/094,590

(22) Filed: Jun. 15, 1998

(30) Foreign Application Priority Data

Jun. 17, 1997 (JP) .............................. 9-176517

(51) Int. Cl.[7] ............................................... H04N 5/91
(52) U.S. Cl. ........................... 386/94; 386/96; 386/106; 360/60; 380/229
(58) Field of Search .............................. 386/39, 45, 96, 386/98–99, 94, 104–106, 125–126; 434/307 A; 369/30; 360/32, 39, 60; 380/229; 84/600–603, 609–610, 615, 617–618, 634, 649, 653, 655–656; 711/163–164

(56) References Cited

U.S. PATENT DOCUMENTS

| | | | | |
|---|---|---|---|---|
| 5,250,747 A | * | 10/1993 | Tsumura | 386/105 |
| 5,481,509 A | * | 1/1996 | Knowles | 369/30 |
| 5,902,115 A | * | 5/1999 | Katayama | 386/106 |

* cited by examiner

*Primary Examiner*—Wendy R. Garber
*Assistant Examiner*—Christopher Onuaku
(74) *Attorney, Agent, or Firm*—Connolly Bove Lodge & Hutz LLP

(57) ABSTRACT

At least one musical composition is transmitted via a digital video disc together with bonus information relating to the musical composition and an approved interactive data required when a user accesses the bonus information. An arbitrary interactive data is entered by the user accessing the bonus information. The transmitted musical composition is reproducible regardless of the entered interactive data. However, a reproduction of the bonus information is allowed only when the entered interactive data agrees with the approved interactive data.

8 Claims, 13 Drawing Sheets

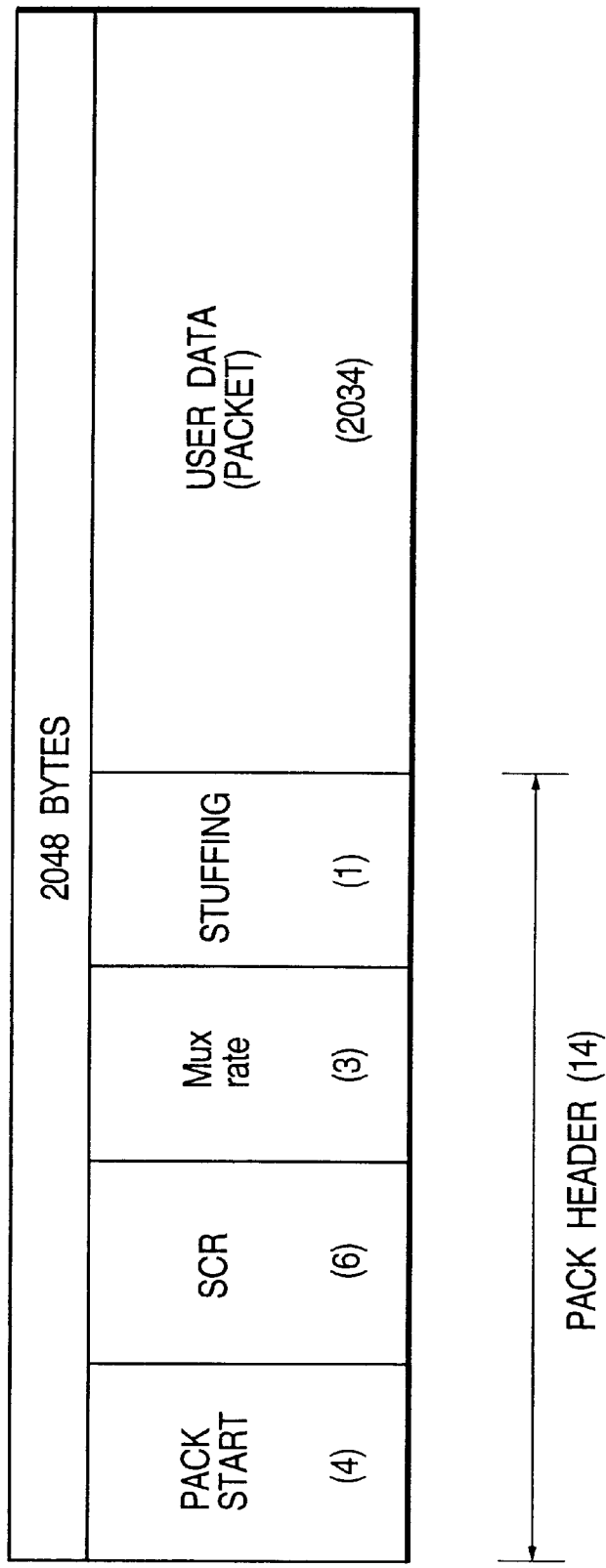

DIGITAL VIDEO DISC ITS RECORDING AND REPRODUCING METHODS AND RELATED ENCODER AND DECODER USING THE SAME

BACKGROUND OF THE INVENTION

The present invention relates to a DVD (i.e., digital video disc, digital versatile disc), its recording and reproducing methods, and related encoding and decoding apparatuses using the DVD.

The DVD has a large capacity compared with a CD (i.e., compact disc), and is preferably used as an audio disc for recording and reproducing musical data.

The DVD has a capability of performing a high-density recording. This provides a surplus recording time. Effectively using the surplus recording time is important when the DVD is used as a musical recording medium. For example, the DVD can be a multipurpose musical source capable of providing various options, such as taped accompaniments and BGM (i.e., background music) sounds, in addition to the playback of original musical compositions. This will broaden the enjoyment of each DVD user.

SUMMARY OF THE INVENTION

An object of the present invention is to provide a DVD allowing users to enjoy the playback of the DVD in various ways or allowing a disc producer to utilize the same disc by different methods. Furthermore, the present invention provides recording and reproducing methods for recording and reproducing audio-related data to and from the DVD, and a related encoding apparatus and a decoding apparatus using the DVD.

In order to accomplish the above and other related objects, a first aspect of the present invention provides a method for recording and reproducing audio-related data to or from a digital video disc, comprising the following steps. In a first step, at least one musical composition is transmitted via a digital video disc together with bonus information relating to the musical composition and an approved interactive data required when a user accesses the bonus information. In a second step, an arbitrary interactive data is entered by the user accessing the bonus information. And, in a third step, the transmitted musical composition is reproduced regardless of the entered interactive data, while a reproduction of the bonus information is allowed only when the entered interactive data agrees with the approved interactive data.

A second aspect of the present invention provides an encoding apparatus for a digital video disc comprising an A/D conversion means for converting audio analog signals of at least one musical composition into a digital form and producing a digital data stream, and a recording means for recording the digital data stream on a digital video disc together with bonus information relating to the musical composition and an approved interactive data required when a user accesses the bonus information.

A third aspect of the present invention provides a digital video disc comprising a first recording portion for storing a digital data stream obtained by A/D converting audio analog signals of at least one musical composition, a second recording portion for storing bonus information relating to the musical composition, and a third recording portion for storing an approved interactive data required when a user accesses the bonus information.

A fourth aspect of the present invention provides a decoding apparatus for a digital video disc which stores a digital data stream obtained by A/D converting audio analog signals of at least one musical composition, bonus information relating to the musical composition, and an approved interactive data required when a user accesses the bonus information. The decoding apparatus comprising an input means for receiving an arbitrary interactive data entered by the user accessing the bonus information, and a reproducing means for reproducing the musical composition regardless of the entered interactive data and allowing a reproduction of the bonus information only when the entered interactive data agrees with the approved interactive data.

A fifth aspect of the present invention provides a method for recording and reproducing audio-related data to and from a digital video disc comprising the following steps. In a first step, at least one musical composition is transmitted via a digital video disc together with a program for reproducing one of musical composition groups and an approved interactive data required when a user accesses a specific musical composition group. In a second step, an arbitrary interactive data is entered by the user accessing the specific musical composition group. And, in a third step, a reproduction of the specific musical composition group is allowed only when the entered interactive data agrees with the approved interactive data.

A sixth aspect of the present invention provides an encoding apparatus for a digital video disc comprising an A/D conversion means for converting audio analog signals of at least one musical composition into a digital form and producing a digital data stream, and a recording means for recording the digital data stream on a digital video disc together with a program for reproducing one of musical composition groups and an approved interactive data required when a user accesses a specific musical composition group.

A seventh aspect of the present invention provides a digital video disc comprising a first recording portion for storing a digital data stream obtained by A/D converting audio analog signals of at least one musical composition, a second recording portion for storing a program for reproducing one of musical composition groups, and a third recording portion for storing an approved interactive data required when a user accesses a specific musical composition group.

An eighth aspect of the present invention provides a decoding apparatus for a digital video disc which stores a digital data stream obtained by A/D converting audio analog signals of at least one musical composition, a program for reproducing one of musical composition groups, and an approved interactive data required when a user accesses a specific musical composition group, The decoding apparatus comprises an input means for receiving an arbitrary interactive data entered by the user accessing the specific musical composition group, and a reproducing means for reproducing the specific musical composition group only when the entered interactive data agrees with the approved interactive data.

A ninth aspect of the present invention provides an encoding apparatus for a digital video disc comprising an A/D converter for converting audio analog signals of at least one musical composition into a digital form by sampling the audio analog signals at a predetermined sampling frequency to produce a digital data stream. A signal processing circuit processes the digital data stream to produce a user data pack. An encoding circuit receives the user data pack together with bonus information relating to the musical composition and an approved interactive data required when a user accesses the bonus information and producing audio and video data. A modulating circuit modulates the audio and video data according to a modulation procedure suitable for the type of a digital video disc on which the audio and video data are recorded.

A tenth aspect of the present invention provides a decoding apparatus for a digital video disc which stores a digital data stream obtained by A/D converting audio analog signals of at least one musical composition, bonus information relating to the musical composition, and an approved interactive data required when a user accesses the bonus information. The decoding apparatus comprises a judging means for judging whether or not an arbitrary interactive data entered by the user agrees with the approved interactive data. A modulation circuit demodulates received signals in compliance with a demodulation procedure suitable for the digital video disc. A decoding circuit separates the demodulated signal into audio and video packing data of the musical composition and the bonus information. A reproduction control means is provided for reproducing audio and video data of the musical composition from the decoding circuit regardless of the entered interactive data and for allowing a reproduction of the bonus information in response to a judgement result of the judging means only when the entered interactive data agrees with the approved interactive data.

Preferably, the musical composition is a main source to be recorded on or reproduced from the digital video disc. At least one optional source is selectable from the group consisting of taped accompaniments, BGM sounds, MIDI codes, and inquiries (e.g., quiz).

Preferably, the bonus information is a program for reproducing one of musical composition groups and the approved interactive data is required when the user accesses a specific musical composition group.

Preferably, the approved interactive data is a password obtainable by paying for it or by answering a given inquiry.

BRIEF DESCRIPTION OF THE DRAWINGS

The above and other objects, features and advantages of the present invention will become more apparent from the following detailed description which is to be read in conjunction with the attached drawings, in which:

FIG. 5 is a view showing a data format of an audio pack or a video pack formatted by a DVD encoding circuit shown in FIG. 1;

DESCRIPTION OF THE PREFERRED EMBODIMENTS

Figure 1:
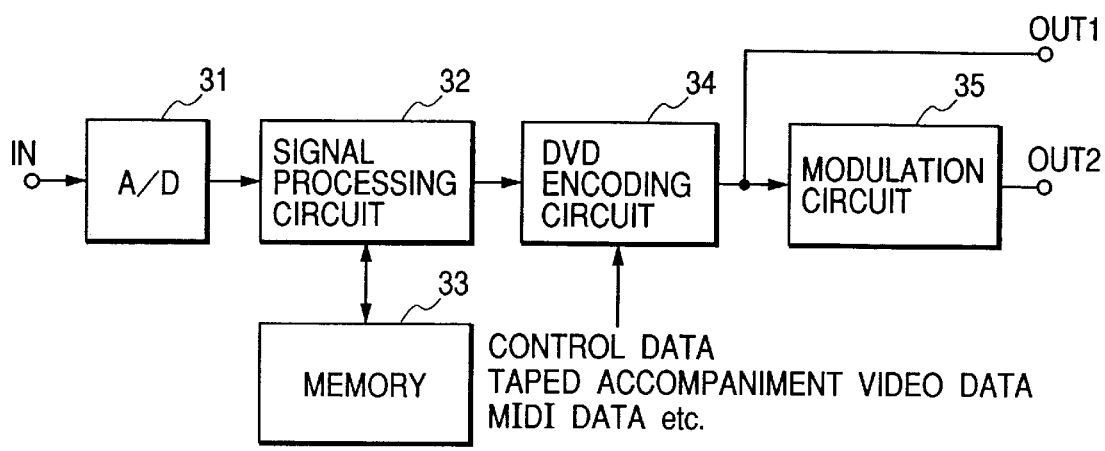
FIG. 1 is a block diagram showing an encoding apparatus for a DVD in accordance with a preferred embodiment of the present invention.

Hereinafter, preferred embodiments of the present invention will be explained with reference to the attached drawings. Identical parts are denoted by the same reference numerals throughout the views.

Figure 3:
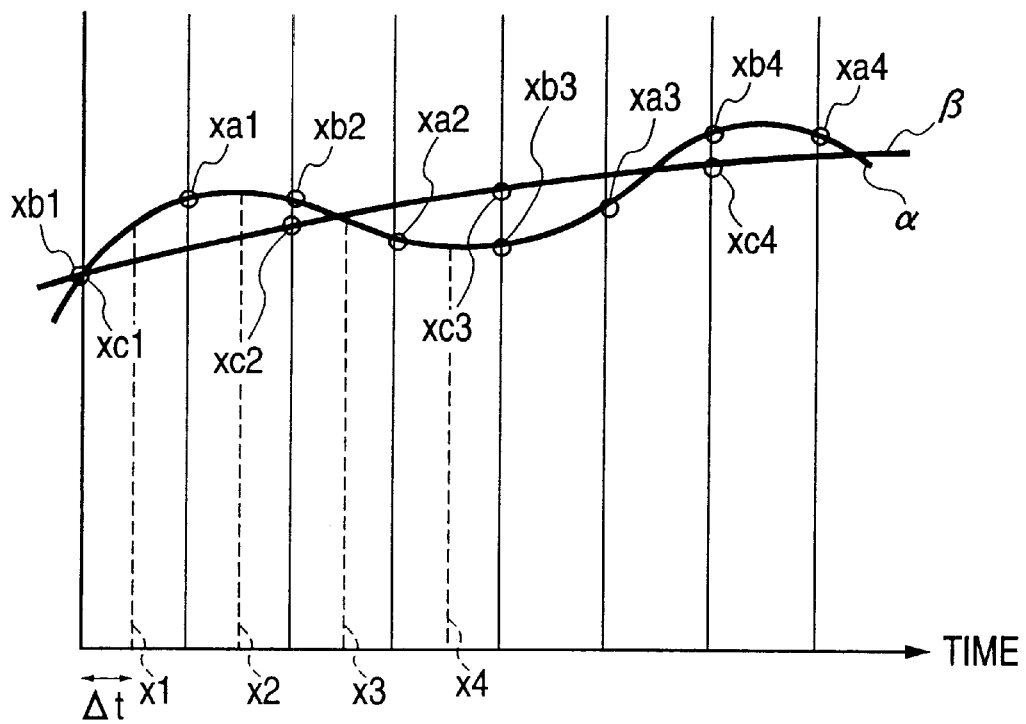
FIG. 3 is a graph illustrating A/D converted data streams in relation to sampling intervals of an A/D converter shown in FIG. 1.

FIG. 1 shows an arrangement of an encoding apparatus having an input terminal IN. An audio analog signal, entered from the input terminal IN, is supplied to an A/D converter 31. The A/D converter 31 performs a sampling operation of the audio analog signals at a predetermined sampling frequency (corresponding to a predetermined sampling interval $\Delta t$ shown in FIG. 3). For example, the sampling operation can produce a high-resolution PCM (i.e., pulse code modulation) signal of 24 bits at a sampling frequency of 192 kHz FIG. 3 shows a data stream (xbi, x2i−1, xai, x2i) consisting of sampled data xb1, x1, xa1, x2, xb2, x3, xa2, - - - , xbi, x2i−1, xai, x2i, - - - obtained from a given curve α.

The obtained data stream (xbi, x2i−1, xai, x2i) is processed by a signal processing circuit 32 associated with a memory 33. The memory 33 is a buffer memory used when the audio data are encoded and is functional as a calculation memory or its auxiliary memory (e.g., settings of coefficients).

The output of the signal processing circuit 32 is supplied to a DVD encoding circuit 34. The DVD encoding circuit 34 produces a packing of the audio and video DVD data according to predetermined DVD data formats. The packing data is directly output from an output terminal OUT1, or modulated by a modulation circuit 35 according to a modulation procedure suitable for the type of DVD and output from another output terminal OUT2.

Figure 2:
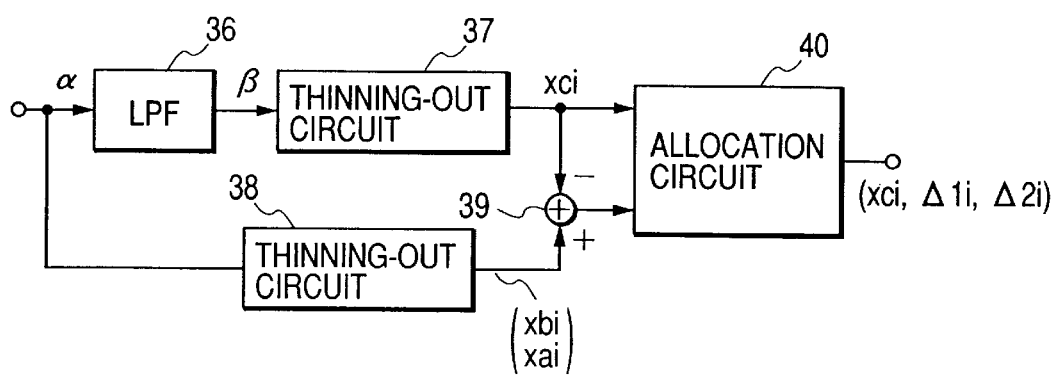
FIG. 2 is a block diagram showing a detailed arrangement of a signal processing circuit shown in FIG. 1.

FIG. 2 shows a detailed arrangement of the signal processing circuit 32. A low-pass filter 36 is, for example, an FIR (i.e., finite impulse response) filter that allows the data to pass a ½ band. The low-pass filter 36 inputs the data stream (xbi, x2i−1, xai, x2i) corresponding to the curve α and produces a data stream (xci, *, *, *) consisting of band-limited data xc1, *, *, *, xc2, *, *, *, xc3, *, *, *, - - - , xci, *, *, *, - - - corresponding to a curve β.

The band-limited data of the curve β are then entered into a thinning-out (i.e., decimating) circuit 37. The thinning-out circuit 37 performs a thinning (i.e., decimating) operation and produces a data stream (xci) consisting of thinned-out (i.e., decimated) data xc1, xc2, xc3, - - - , xci, - - - , as a result of the thinning operation for removing all of the data "*".

The data stream (xci) is a data stream of sampling data obtained as a result of a sampling operation performed at a ¼ sampling frequency on the digital data converted by the A/D converter 31.

Another thinning-out circuit 38 inputs the data stream (xbi, x2i−1, xai, x2i) corresponding to the curve α and produces a data stream (xbi, xa1) consisting of thinned-out data xb1, xa1, xb2, xa2, - - -, xbi, xai, - - -, as a result of the tinning operation for removing all of the data "xi".

An adder 39, serving as a differential calculator, obtains the following differences based on the obtained data streams xci, xbi and xai.

xbi−xci=Δ1i xai−xci=Δ2i

The calculated differential data Δ1i and Δ2i are equal to or less than 24 bits. The bit number is either a fixed value or a variable value.

Figure 4:
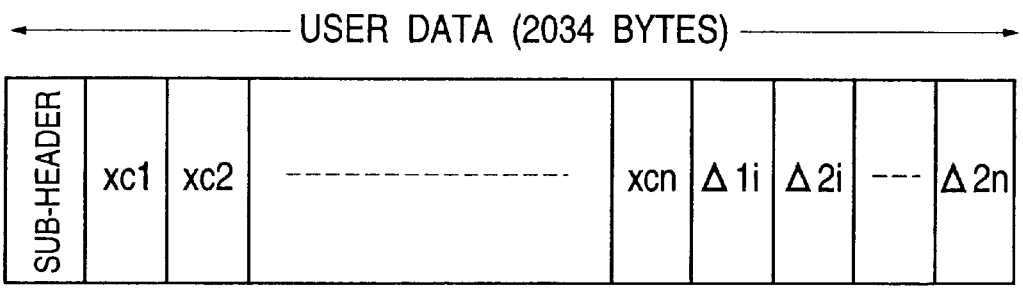
FIG. 4 is a view showing a data format of user data processed by the signal processing circuit shown in FIG. 2.

An allocation circuit 40 receives the data stream xci and the differential data Δ1i and Δ2i to produce a user data pack in a predetermined format shown in FIG. 4 (1 packet=2,034 bytes). The user data pack is sent to the DVD encoding circuit 34.

The DVD encoding circuit 34 produces an audio pack (or a video pack) including a pack header of 14 bytes in addition to one packet of the user data (=2,034 bytes). As shown in FIG. 5, the pack header includes a pack start information area of 4 bytes, an SCR (i.e., system clock reference) information area of 6 bytes, a Mux (i.e., multiplex) rate information area of 3 bytes, and a stuffing information area of 1 byte. Thus, one audio (or video) pack consists of a total of 2,048 bytes. The audio pack includes the audio data in its user data area, while the video pack includes related video data in its user data area.

In this case, the SCR information serves as a time stamp. The SCR is "1" in a head pack of an ACB (i.e., audio contents block) unit and continuous in the same album. This makes it possible to administrate the time of each audio pack in the same album. Furthermore, it is possible to use the SCR information for numbering a plurality of audio pack groups.

The DVD encoding circuit 34 produces packing data of a main source of musical compositions to be recorded on the DVD, as well as packing data of taped accompaniments (i.e., so-called KARAOKE, audio and video signals), BGM sounds (audio signals), MIDI codes (data), and quiz information (data).

Figure 6A:
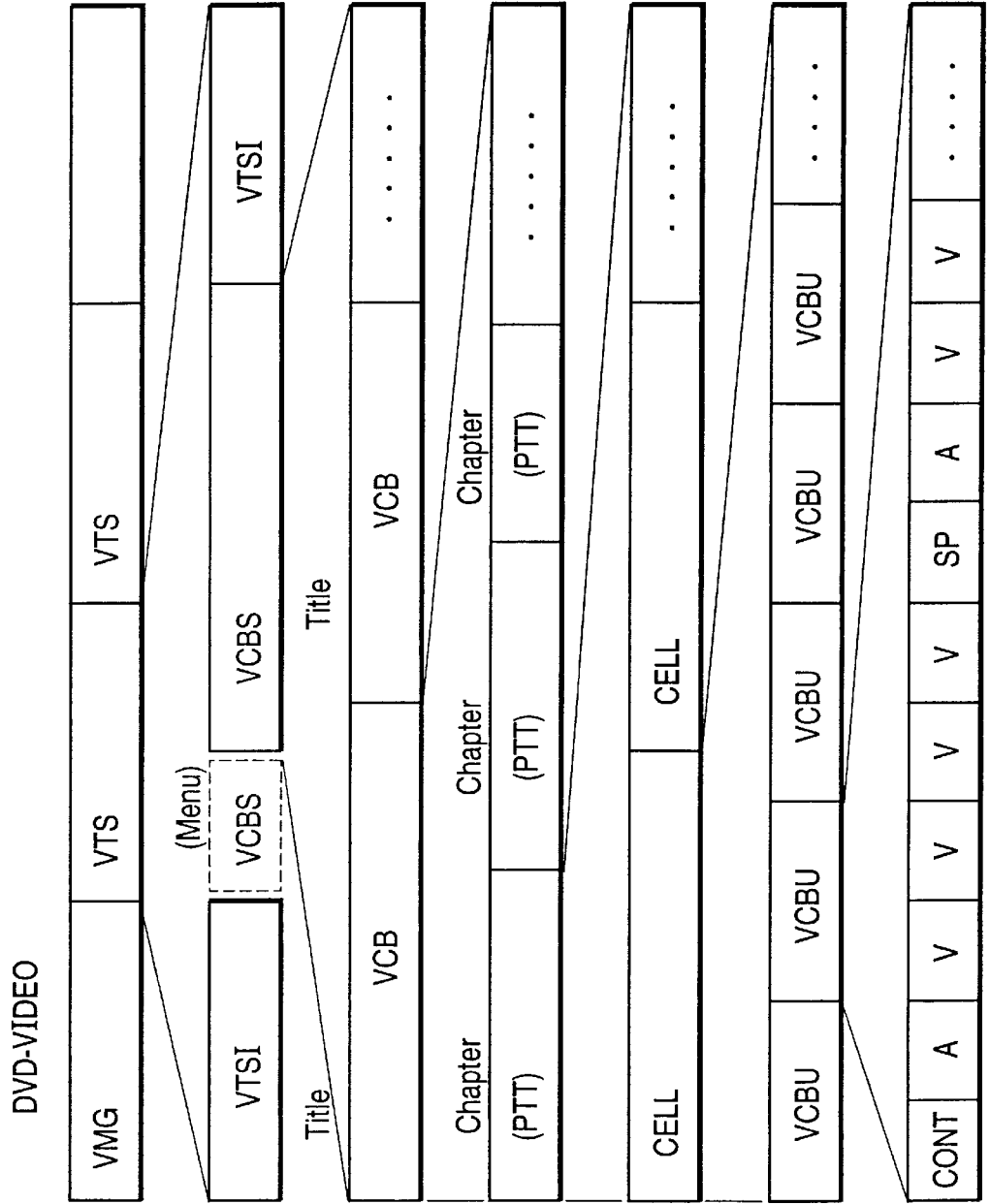
FIGS. 6A and 6B are views showing a DVD-video data format and a DVD-audio data format formatted by the DVD encoding circuit shown in FIG. 1.
Figure 6B:
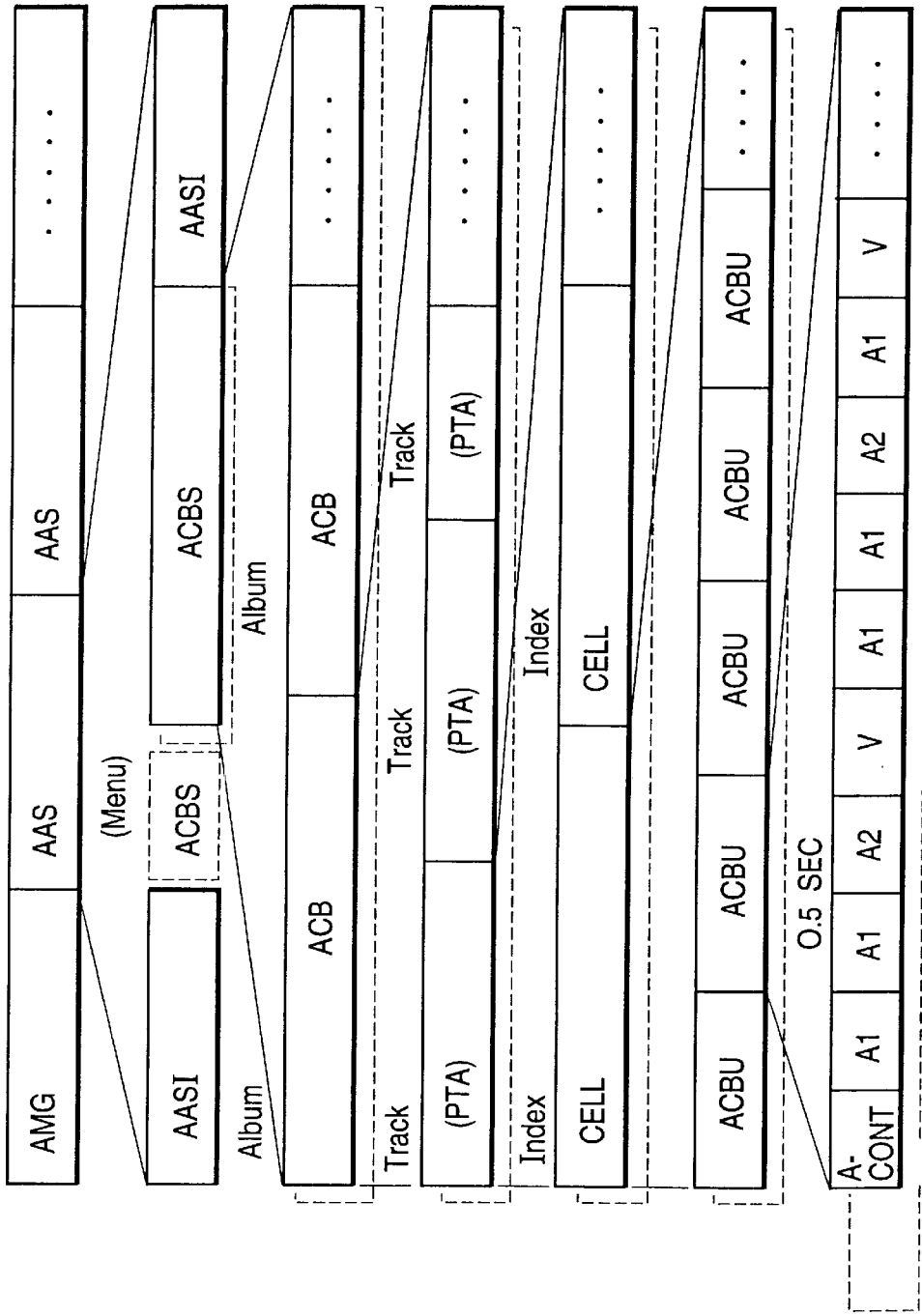

FIG. 6A shows a pack format used for recording the DVD-video data on the DVD. FIG. 6B is a pack format used for recording the DVD-audio data on the DVD. The DVD-audio data format of FIG. 6B is compatible with the DVD-video data format of FIG. 6A, although they use different area names. For example, the DVD-video data format of FIG. 6A comprises a VMG (i.e., video manager) area at a head thereof and a plurality of VTS (i.e., video title set) areas succeeding the VMG area. On the other hand, the DVD-audio data format of FIG. 6B comprises an AMG (i.e., audio manager) area at a head thereof and a plurality of AAS (i.e., audio album set) areas succeeding the AMG area, as counterparts of the VMG and VTS area of the DVD-video data format.

The VTS area comprises a leading VTSI (i.e., VTS information) area located at a head thereof, at least one VCBS (i.e., video contents block set) area succeeding the leading VTSI area, and a trailing VTSI area located at the last position. Similarly, the AAS area comprises a leading AASI (i.e., AAS information) area located at a head thereof, at least one ACBS i.e., audio contends block set) area succeeding the leading AASI area, and a trailing AASI area located at the last position. The AASI information includes actual performance times of respective musical compositions stored in the ACBS area.

As shown in FIG. 6A, each VCBS area includes a plurality of VCB areas each corresponding to one title of video. Each VCB (i.e., one title) area consists of a plurality of chapters. The chapter includes PTT (i.e., part of title). Each chapter consists of a plurality of cells. Each cell consists of a plurality of VCBU (i.e., VCB unit). Each VCBU consists of a plurality of packs. Each pack is 2,048 bytes. Each VCBU comprises a CONT (i.e., control) pack positioned at a head thereof, a plurality of V (i.e., video), A (i.e., audio) and SP (i.e., sub picture) packs succeeding the CONT pack. The CONT pack includes control information for controlling the succeeding V packs. The user data area of each V pack stores various video data, including video images of the taped accompanimnents, superimposition data for each taped accompaniment, MIDI codes, and quiz data.

Figure 7:
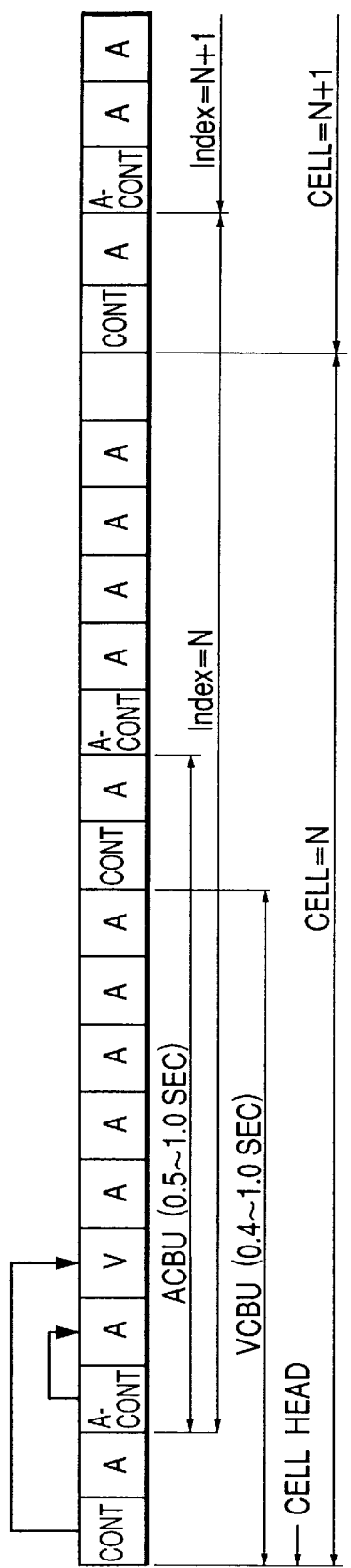
FIG. 7 is a view showing a detailed arrangement of ACBU (i.e., audio contents block unit) shown in FIG. 6B.

On the other hand, as shown in FIG. 6B, each ACBS area includes a plurality of ACB areas each corresponding to one album of audio. Each ACB (i.e., one album) area consists of a plurality of tracks. The track includes PTA (i.e., part of album). Each track consists of a plurality of indexes corresponding to the cells of the chapter. Each index consists of a plurality of ACBU (i.e., ACB unit). Each ACBU consists of a plurality of packs. Each pack is 2,048 bytes. Each ACBU comprises an A-CONT (i.e., audio control) pack positioned at a head thereof. This A-CONT is a counterpart of the CONT pack of the VCBU. A plurality of A (i.e., audio) packs, as well as V (i.e., video) and SP (i.e., sub picture) packs if necessary, succeed the A-CONT pack. FIG. 7 shows a detailed arrangement of the ACBU. The A-CONT pack includes administration information, such as TOC (i.e., table of contens) information, fr administrating audio signals of the succeeding "A" packs. The user data area of each "A" pack stores various audio data including original musicall compositions as well as the bonus information or group information, such as taped accompaniments and BGM sounds.

Figure 8:
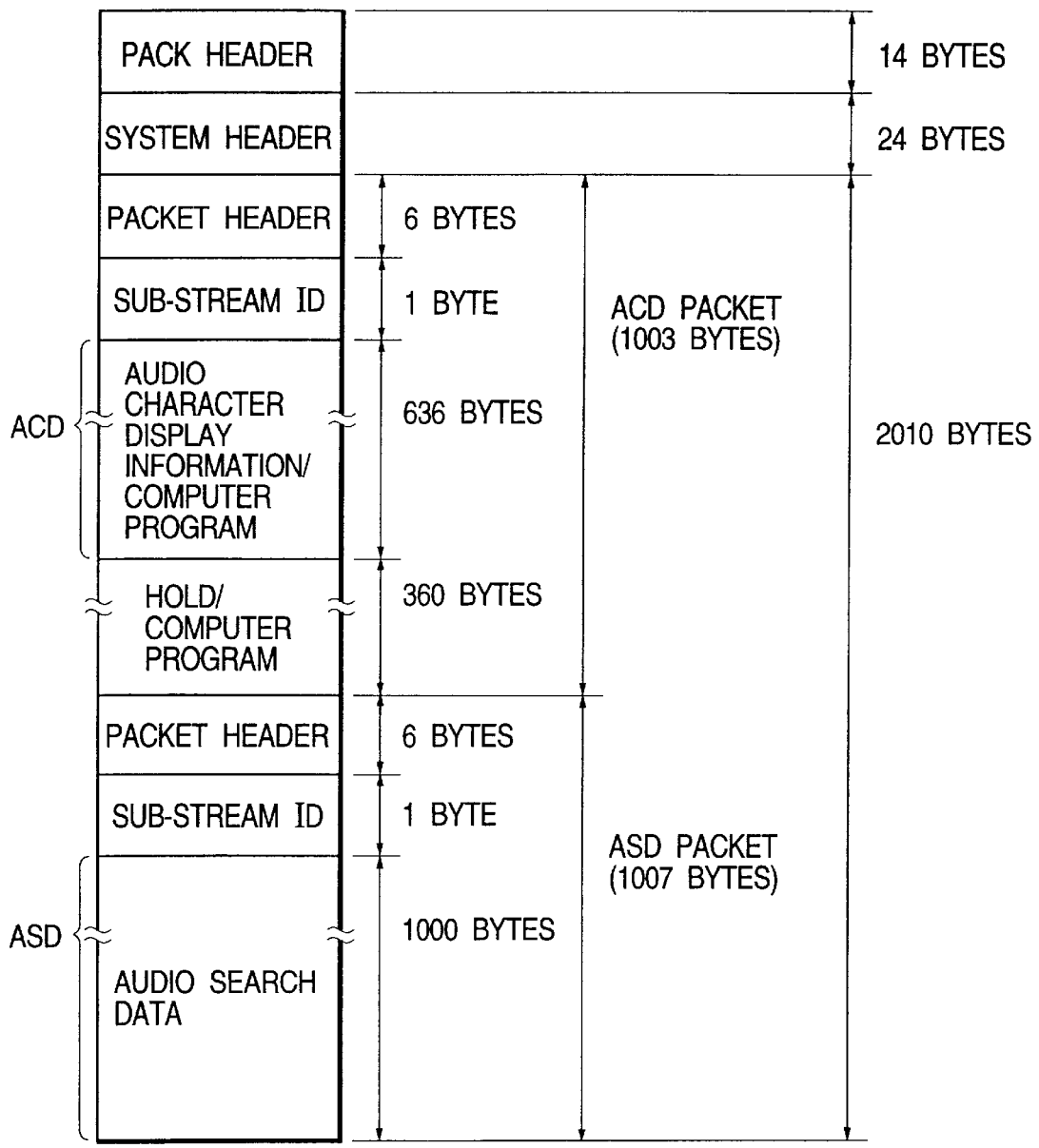
FIG. 8 is a view showing a detailed arrangement of A-CONT(i.e., audio control) pack shown in FIG. 7.

FIG. 8 shows a detailed arrangement of the A-CONT pack. The A-CONT pack comprises a pack header of 14 bytes, a system header of 24 bytes, an ACD (i.e., audio character display) packet of 1,003 bytes, and an ASD (i.e., audio search data) packet of 1,007 bytes. The ACD packet consists of a packet header of 6 bytes, a sub-stream ID of 1 byte, an ACD area of 636 bytes, and a hold area of 360 bytes. The ACD area includes audio character display information an approved password for reproducing the bonus information and a computer program for reproducing each group of the musical compositions. The hold, area can be used as a spare area for storing the password and the computer program. Similarly, the ASD packet consists of a packet header of 6 bytes, a sub-stream ID of 1 byte, and an ASD (i.e., audio search data) area of 1,000 bytes.

Figure 9:
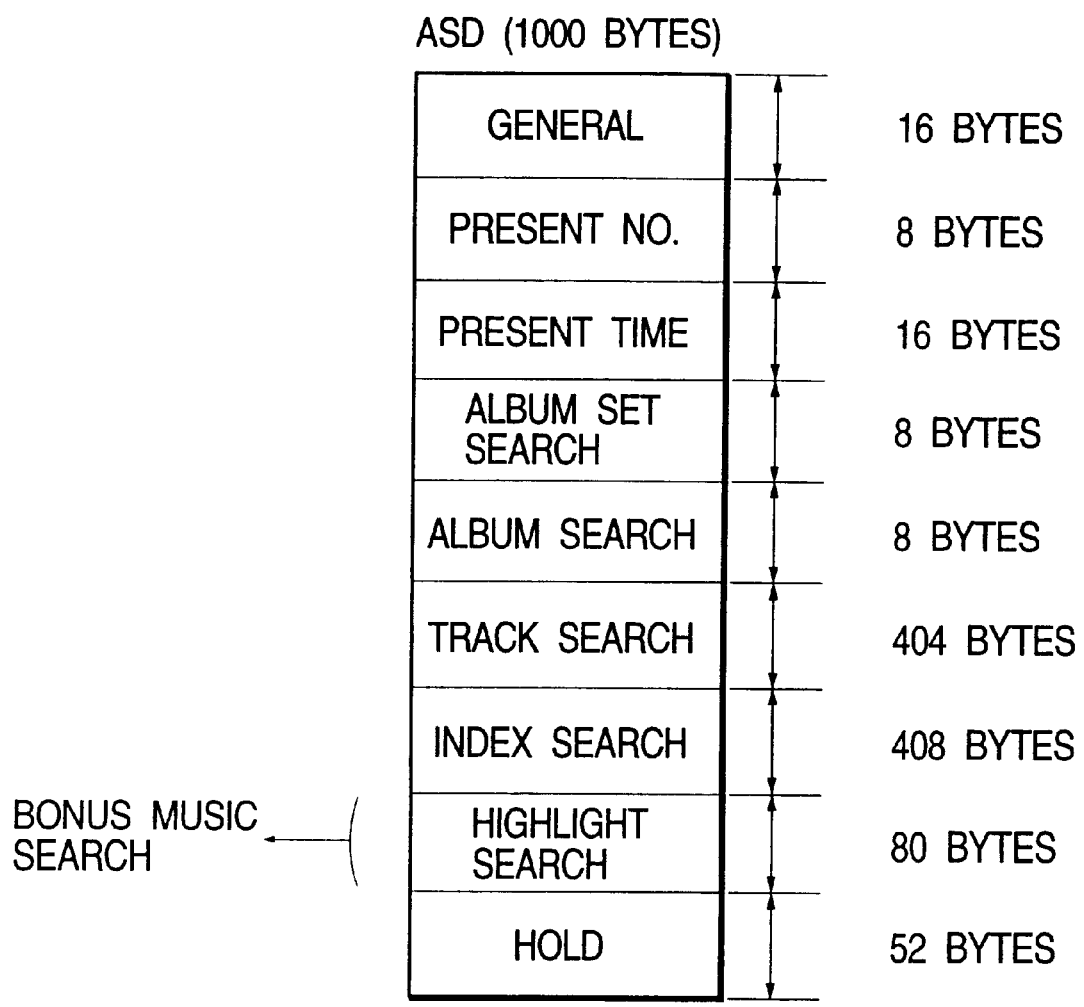
FIG. 9 is a view showing a detailed arrangement of ASD (i.e., audio search data) in the A-CONT pack shown in FIG. 8.

FIG. 9 shows a detailed arrangement of ASD storing various information. More specifically, the ASD includes a general information area of 16 bytes, a present number information area of 8 bytes, a present time information area of 16 bytes, an album set search information area of 8 bytes, an album search information area of 8 bytes, a track search information area of 404 bytes, an index search information area of 408 bytes, a highlight search information area of 80 bytes, and a hold area of 52 bytes. The highlight search information is required to search the bonus information.

According to the above-described data format of the preferred embodiment, an arbitrary "A" pack can store the audio signals of an original musical composition. An adjacent "A" pack may store the bonus information relating to the original musical composition, such as optional music signals of the corresponding taped accompaniments. An adjacent "V" pack may store superimposition data for the taped accompaniments. Furthermore, another adjacent "A" pack may store BGM sound signals or rehearsal voice data. Another adjacent "V" pack may store MIDI codes of the original musical compositions.

For each user purchasing this DVD, reproducing the original musical composition is free of charge. However, when the user desires to reproduce any bonus information other than the original musical composition, the user must enter a right or registered password and pay for it.

According to another possible method for utilizing this DVD, a quiz program (free of charge) can be stored. The quiz is displayed at a decoder. When a right answer is entered, each user is allowed to reproduce the bonus information. Alternatively, the musical compositions can be divided into a plurality of groups. The A-CONT pack stores a reproduction program for reproducing each music composition group. Each user enters a designated password to reproduce a preferable musical composition group.

Next, a detailed arrangement of a decoding apparatus will be explained with reference to FIG. 10. The decoding apparatus comprises an input terminal 41a for receiving signals read from the DVD. A demodulating circuit 41 demodulates the received signals in compliance with a demodulation procedure corresponding to the modulation procedure at the modulation circuit 35 of the encoding apparatus. Each demodulated signal enters in a DVD decoding circuit 42. The DVD decoding circuit 42 separates the demodulated signal into an A-CONT pack, or a CONT pack, and a predetermined number of "A" and "V" packs. The "A" pack stores user data (i.e., data stream xci and differential data $\Delta 1i$ and $\Delta 2i$) that are supplied to a bit-stream output terminal 52 via a switch 51 and also supplied to a signal processing circuit 43. The signal processing circuit 43 is associated with a memory 44. The memory 44 is a buffer memory used when the audio data are decoded and is functional as a calculation memory or its auxiliary memory.

Figure 11:
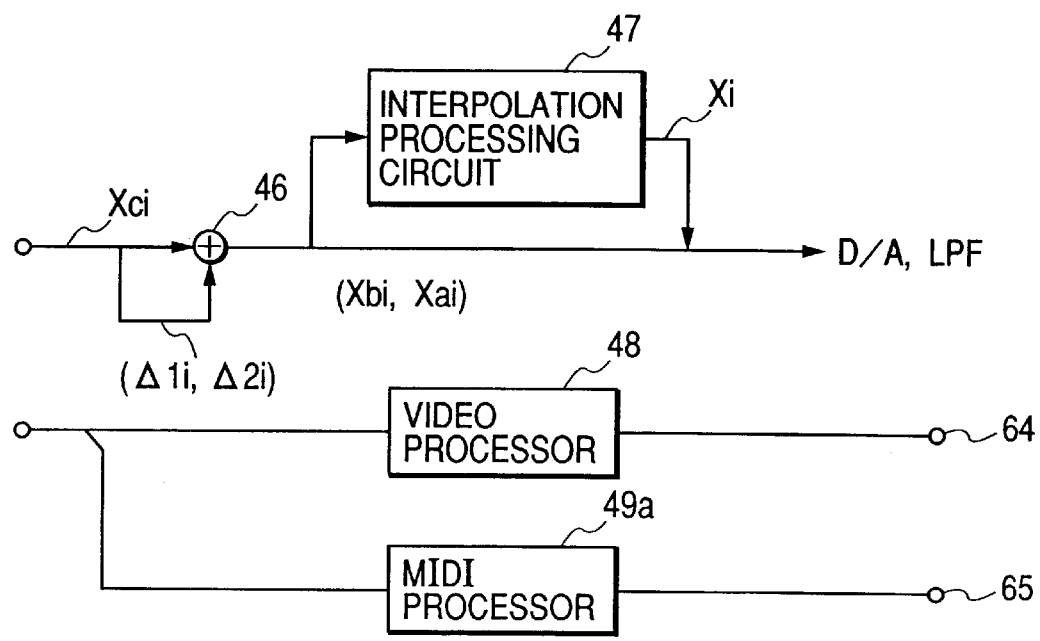
FIG. 11 is a block diagram showing a detailed arrangement of a signal processing circuit shown in FIG. 10.

FIG. 11 shows a detailed arrangement of the signal processing circuit 43. The video data stored in the "V" pack are supplied to a video processor 48 of the signal processing circuit 43 and then sent to an external display unit (not shown) via a video output terminal 64. Furthermore, the MIDI codes stored in the "V" pack are supplied to a MIDI processor 49a of the signal processing circuit 43 and then sent to an external electronic musical instrument (e.g., a synthesizer) via a MIDI output terminal 65.

The signal processing circuit 43 comprises an adder 46 that performs the following calculations to restore the data streams xbi and xbi.

$$\Delta 1i + xci = xbi$$

$$\Delta 2i + xci = xai$$

Figure 12:
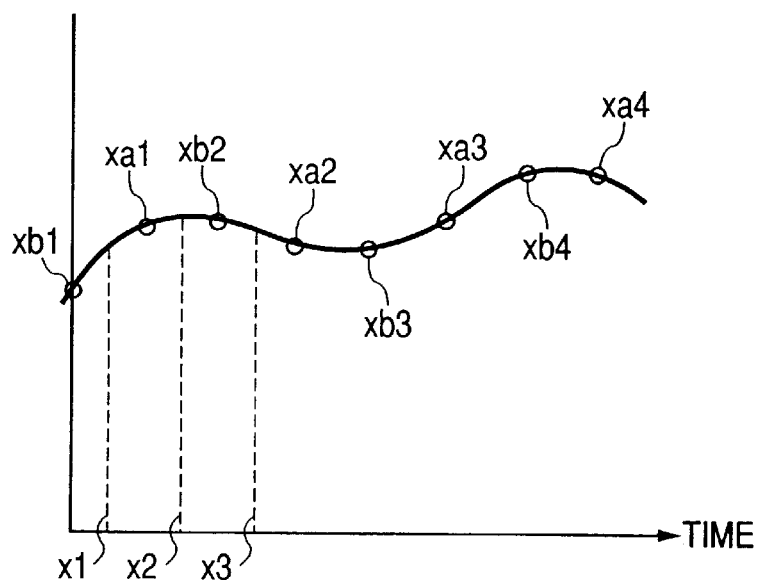
FIG. 12 is a graph illustrating the interpolation processing performed in the signal processing circuit shown in FIG. 11.

The restored data streams xbi and xbi, being the same 24 bits as the original ones, are then supplied to an interpolation processing circuit 47. FIG. 12 shows the interpolation processing performed by the interpolation processing circuit 47, according to which the data stream xi is interpolated by using a plurality of data of the data streams xai and xbi.

The interpolation processing circuit 47 may use an up-sampling method to obtain the interpolated data stream xi. Alternatively, the interpolated data stream xi can be obtained by using a curve fitting or a predictive approximation. In this case, transmitting additional and supplemental data is effective to increase the accuracy in the curve fitting or predictive approximation.

The data, obtained through this interpolation, are rearranged in the following manner.

xb1, x1, xa1, x2, xb2, x3, xa2, - - - , xbi, x2i−1, xai, x2i, - - -

Figure 10:
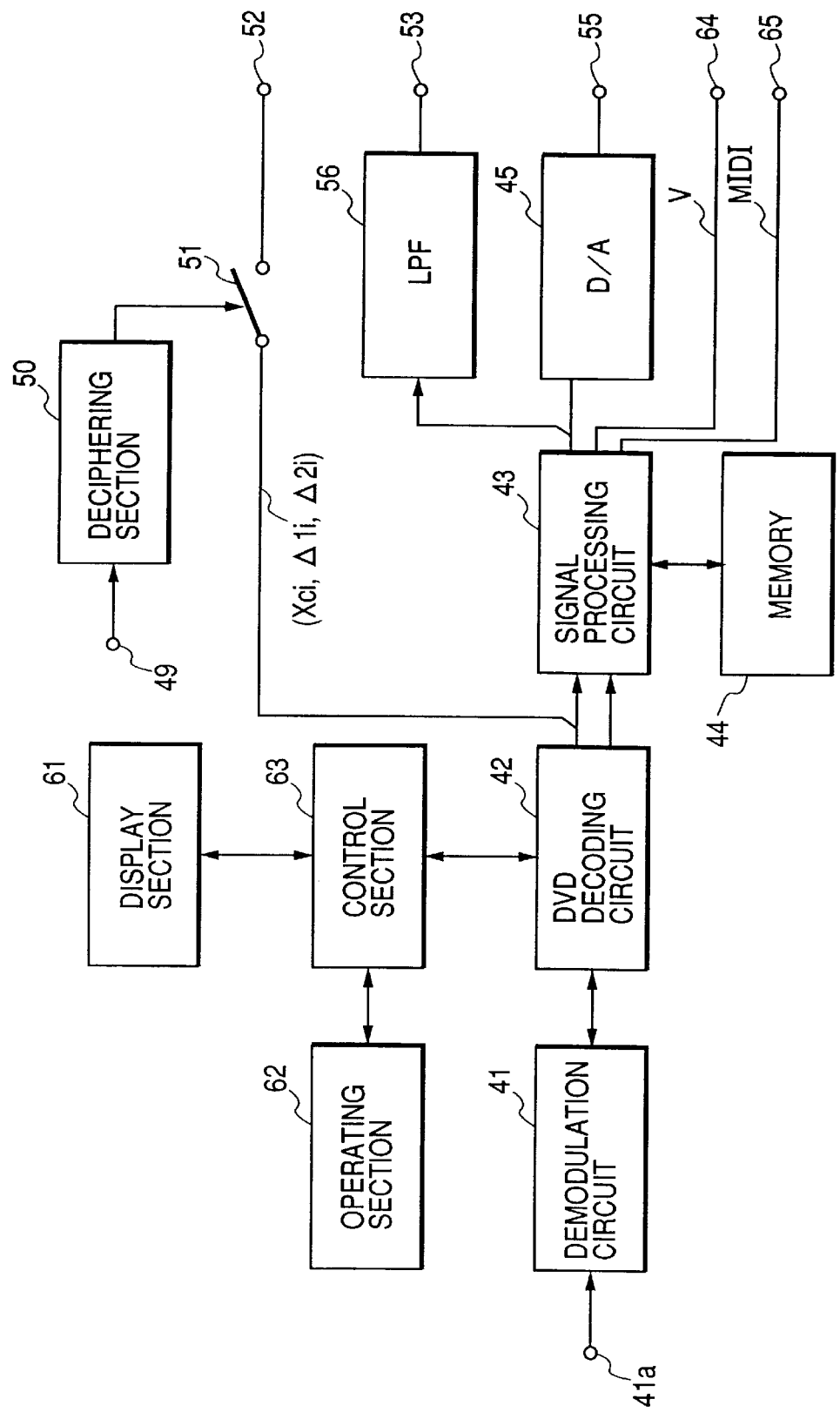
FIG. 10 is a block diagram showing a decoding apparatus for the DVD in accordance with a preferred embodiment of the present invention.

The rearranged data are supplied to a D/A converter 45 shown in FIG. 10 and also to an LPF (i.e., low-pass filter) 56.

The D/A converter 45 converts the received data into an analog signal according to a quantized bit number (i.e., 24 bits) of the encoding apparatus. In short, the data stream (xbi, x2i−1, xai, x2i) is converted into an audio analog signal at a sampling frequency of 192 kHz. The analog audio signal is output through an analog output terminal 55. Furthermore, the LPF 56 limits the input data into a ¼ band (i.e., 48 kHz). The band-limited data, in the digital form, are output from an output terminal 53.

According to this embodiment, the bit stream (i.e., data stream xci and differential data $\Delta 1i$ and $\Delta 2i$) transmitted via a recording medium can be directly output through the switch 51 and the bit-stream output terminal 52. Furthermore, the decoding apparatus comprises a deciphering section 50 that receives a password entered by a user from an input terminal 49. The input terminal 49 serves as a terminal for generating a copy (recording) allowance signal, as well as a terminal for inputting the password. The deciphering section 50 on-and-off controls the switch 51 based on the entered password and copyrights information stored in a sub header. The deciphering section 50 has an authentication function for judging whether or not the entered password is correct.

When the password is entered, the deciphering section 50 performs the authentication processing. When the password is correct, the deciphering section 50 checks the copy allowance conditions, such as an amount and a way of payment, referring to the copyrights information stored in the sub header. When the copy allowance conditions are all established, the deciphering section 50 closes the switch 51 to permit the user to copy the bit stream data.

Furthermore, the decoding apparatus comprises an operating section 62, such as a keyboard of a computer. The operating section 62 is connected to a control section 63. The operating section 62 allows the user to enter an interactive input signal for designating a portion to be reproduced, and allows the user to enter an answer of the quiz displayed on a display section 61. The operating section 62 can be used as the input terminal for entering the password. The display section 61 is connected to the control section 63. In this case, the band pass can be arbitrarily limited. Furthermore, it is possible to select a desirable scene with its sounds and images to realize a storied (or highlighted) reproduction.

Figure 13:
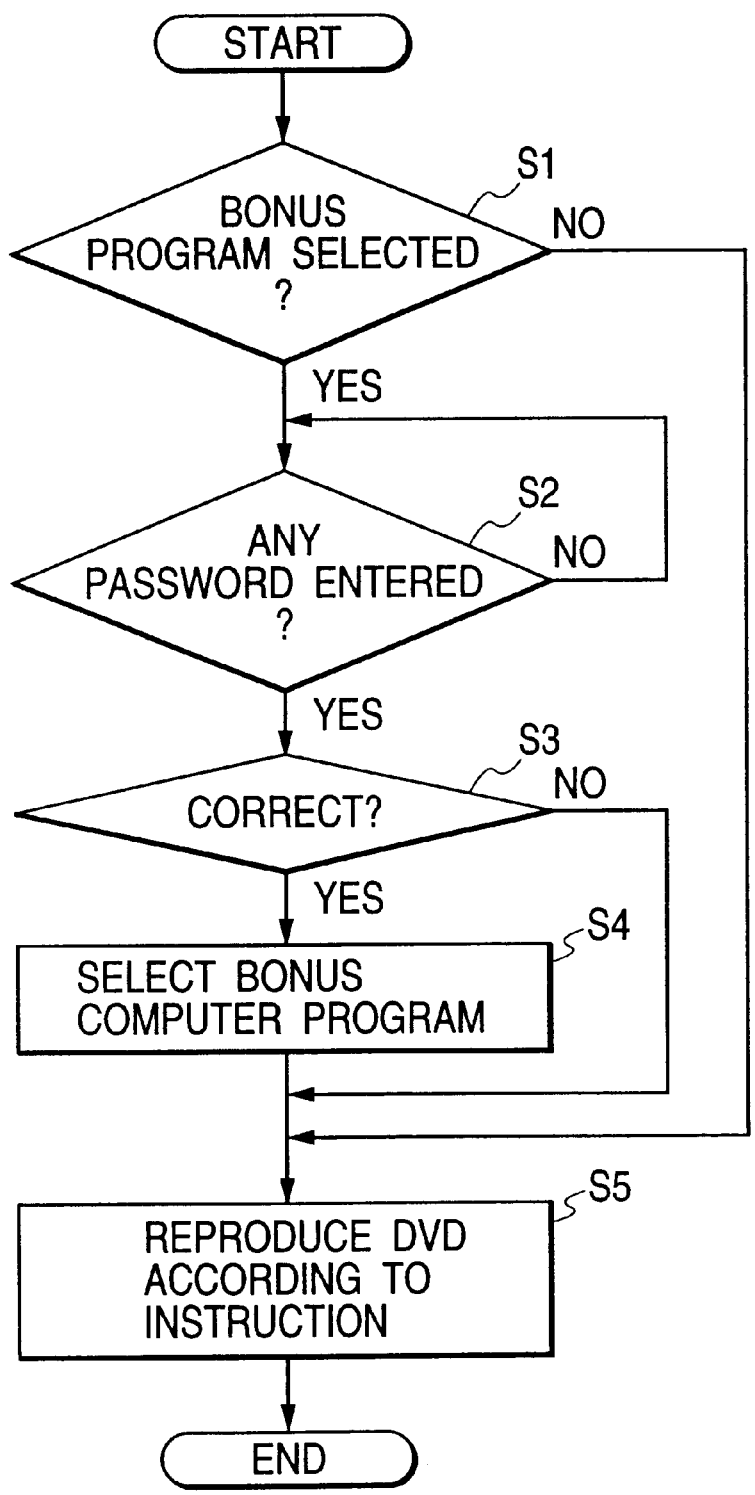
FIG. 13 is a flowchart explaining the playback processing performed in a control section shown in FIG. 10.

FIG. 13 is a flowchart showing a reproduction processing performed in the control section 63. In a step S1, it is checked whether or not a bonus computer program is selected. When no bonus computer program is selected (i.e., NO in step S1), the control flow proceeds to a step S5. When the bonus computer program is selected (i.e., YES in step S1), the control flow proceeds to a step S2 to check whether or not any password is entered by the user. The processing of step S2 is repeated until any password is entered (i.e., NO in step S2). When the user enters an arbitrary password (i.e., YES in step S2), the control flow proceeds to a step S3 to check whether or not the entered password agrees with the approved or registered password. When the password is correct (i.e., YES in step S3), the control flow proceeds to a step S4 to select the designated bonus computer program. A loading of the bonus computer program is allowed. Then, the control flow proceeds to the step S5. On the other hand, when the password is incorrect (i.e., NO in step S3), the control flow skips the step S4 and proceeds to the step S5 to perform the reproduction of the DVD according to the instruction.

The bonus information pack can be disposed in a mixed relationship with the "A" pack storing the original musical composition. Alternatively, it is possible to record the bonus information on specific tracks of the DVD.

As another embodiment, a program may set a valid term limiting the use of the disc. In this case, it is preferable that the users can have a chance to use the disc even after the valid term expires. To realize this, each user can be allowed to extend the valid term by entering a password. In response to the entry of the password, a bonus program effecting the extension of the valid term is selected. To store the entered password, the deciphering section 50 may have a nonvolatile memory capable of storing the password until the extended valid term expires. The user can repetitively access the disc information without entering the password.

Figure 14:
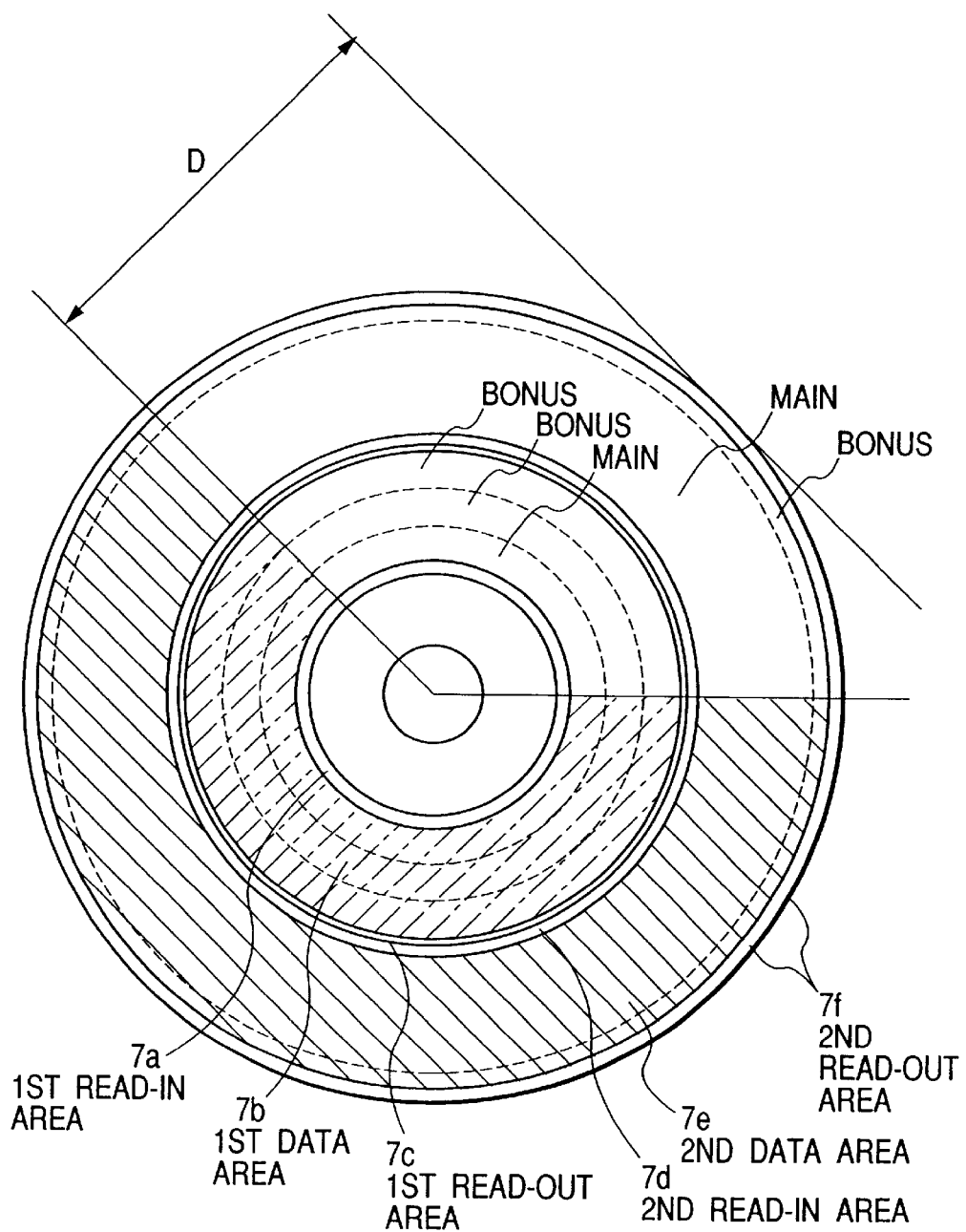
FIG. 14 is a view showing an example of bonus information areas.

FIG. 14 shows an example of bonus information areas allocated on specific tracks of the DVD. More specifically, a first read-in area 7a, a first data area 7b, a first read-out area 7c, a second read-in area 7d, a second data area 7e, and a second read-out area 7f are located from a radially inward end to a radially outward end. The first data area 7b and the second data area 7e are separated into main data tracks and bonus information tracks, respectively.

In this case, the bonus information tracks can be accessed only when the reproduction allowance conditions are all established. For example, the reproduction allowance conditions can be established when the entered password is correct or when a right answer is entered in response to the quiz provided from the computer program. Alternatively, it is possible to perform the reproduction based on the highlight search information stored in the ASD shown in FIG. 9.

Figure 15:
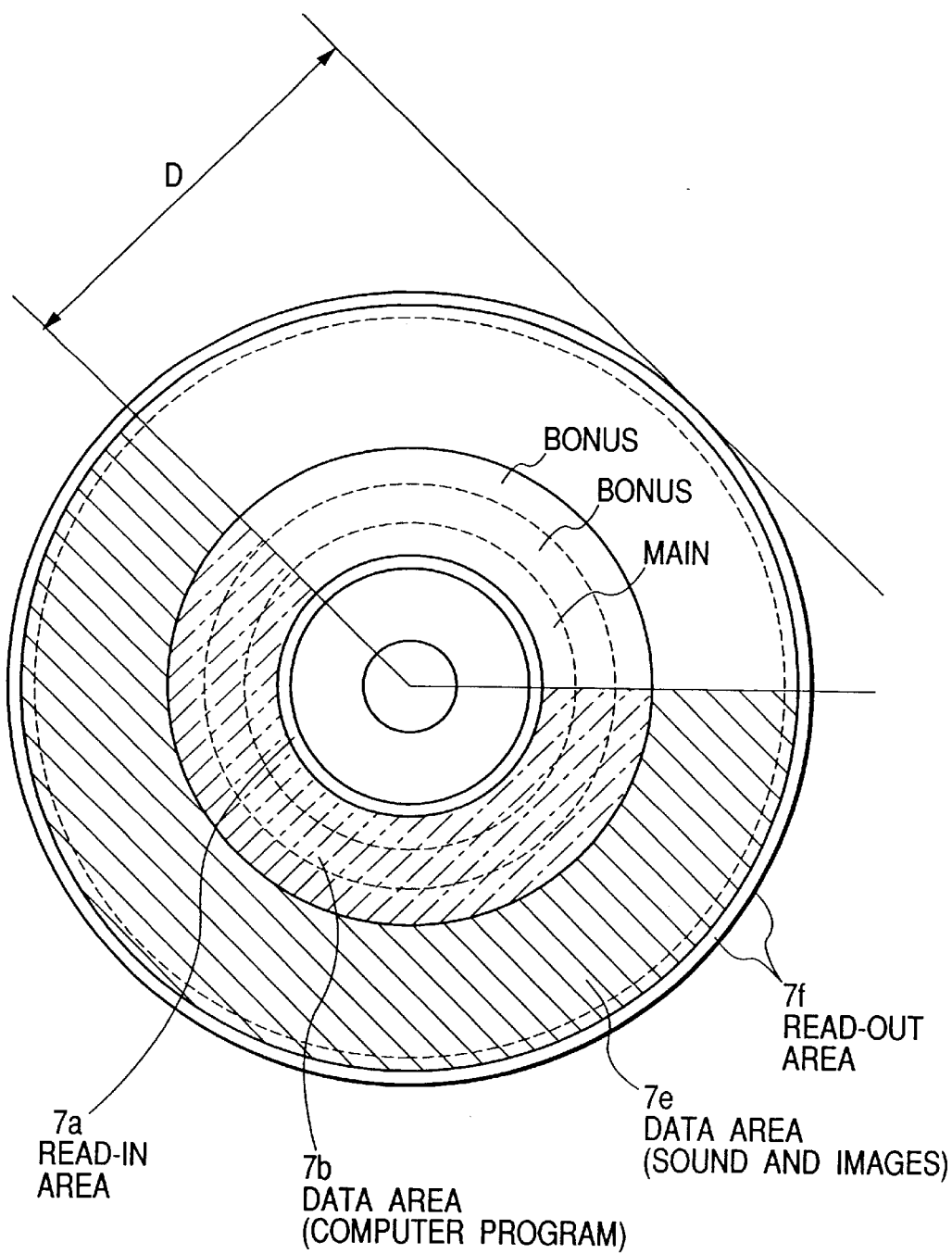
FIG. 15 is a view showing another example of bonus information areas.

FIG. 15 shows another example of bonus information areas, according to which only one read-in area 7a is provided and the data area 7b is dedicated to the computer program including the bonus information areas.

The DVD used in the present invention is not limited to a single-layered DVD. The present invention can be applicable to a DVD having two-layered or double-sided data layers.

As explained in the foregoing description, the preferred embodiment of the present invention includes the software classified in the following categories.

| | |
|---|---|
| A | bonus information (i.e., bonus musical compositions) |
| B | another-purpose program (e.g., taped accompaniments reproduction program) |
| C | bonus program |

The programs B and C are stored in the following areas.

| | |
|---|---|
| a | A-CONT pack |
| b | program area, such as first data area 7b |

The following is a possible ten combinations of the program(s) and the recording area.

| | | |
|---|---|---|
| 1 | A + a | Only one program is available, and the bonus information "A" is reproducible by paying for it or by answering a quiz. |
| 2 | A + b | Only one program is available, and the bonus information "A" is reproducible by paying for it or by answering a quiz. |
| 3 | B + a | Two or more programs are available, and one of them is selectable and useable as another disc software, such as taped accompaniments. |
| 4 | B + b | Two or more programs are included, and a selected program is available as another disc software. |
| 5 | A + B + a | Two or more programs are stored in the A-CONT pack, and a selected program is available as another disc software. The bonus information "A" is reproducible by paying for it or by answering a quiz. |
| 6 | A + B + b | Two or more programs are stored in the program area, and a selected program is available as another disc software. The bonus information "A" is reproducible by paying for it or by answering a quiz. |
| 7 | C + a | Only one program is available as a basic program, although a bonus program is selectable as an option and usable as another disc software. Refer to FIG. 13. |
| 8 | C + b | Only one program is available as a basic program, although a bonus program is selectable as an option and usable as another disc software. Refer to FIG. 13. |
| 9 | A + C + a | Only one program is stored in the A-CONT pack as an available basic program, although a bonus program is selectable as an option and usable as another disc software. The bonus information "A" is reproducible by paying for it or by answering a quiz. |
| 10 | A + C + b | Only one program is stored in the program area as an available basic program, although a bonus program is selectable as an option and usable as another disc software. The bonus information "A" is reproducible by paying for it or by answering a quiz. Refer to FIG. 14. |

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An encoding apparatus for encoding audio signals of a digital video disc, comprising:

an A/D conversion means for converting analog audio signals of at least one original music selection as well as analog audio signals of related bonus music into a digital form to produce a digital data stream, said original music selection being reproduced unconditionally any time when a user requests playback of said original music selection, while said bonus music is reproduced conditionally only when required conditions are satisfied by the user, and playback of said bonus music selection is prohibited irrespective of user's playback request when the required conditions are not satisfied; and a recording means for recording said digital data stream, wherein said recording means is an information recording medium having a recording area for main signals and a recording area for auxiliary signals continuously disposed; and said main signal recording area stores at least the following information:

an audio manager (AMG) for administrating said at least one original music selection and said related bonus music;

a first audio contents block for storing the substance of said at least one original music selection;

a second audio contents block for storing the substance of said related bonus music; and approved interactive data for authentication which is compared with interactive data for authentication entered by the user when the user requests the playback of said related bonus music to prohibit the playback of said related bonus music irrespective of the user's playback request when the interactive data for authentication entered by the user disagrees with the approved interactive data for authentication stored in said main signal recording area.

2. The encoding apparatus in accordance with claim 1, wherein said approved interactive data for authentication stored in said main signal recording area is a password.

3. The encoding apparatus in accordance with claim 1, wherein said approved interactive data for authentication stored in said main signal recording is obtainable by paying for it.

4. The encoding apparatus in accordance with claim 1, wherein said approved interactive data for authentication stored in said main signal recording is an answer for a given inquiry.

5. A decoding apparatus for a digital video disc storing at least the following information:

an audio manager (AMG) for administrating a group consisting of at least one original music selection and a group consisting of at least one bonus music, said original music selection being reproduced unconditionally any time when a user requests playback of said original music selection, while said bonus music is reproduced conditionally only when required conditions are satisfied by the user and playback of said bonus music is prohibited irrespective of a user's playback request when the required conditions are not satisfied;

a first audio contents block for storing the substance of said group consisting of at least one original music selection;

a second audio contents block for storing the substance of said group including at least one bonus music selection; and approved interactive data for authentication which is compared with interactive data for authentication entered by the user when the user requests the playback of said bonus music selection so as to prohibit the playback of said bonus music selection irrespective of a user's playback request when the interactive data for authentication entered by the user disagrees with the approved interactive data for authentication stored on said digital video disc;

wherein said decoding apparatus comprises:

an input means for allowing the user to enter said interactive data for authentication when the user requests the playback of said bonus music; and a reproducing means for reproducing said group consisting of at least one original music selection unconditionally any time when the user requests playback of said original music selection, and for reproducing said group consisting of at least one bonus music selection conditionally only when said interactive data for authentication entered by the user agrees with said approved interactive data for authentication stored in said digital video disc and prohibiting the playback of said group consisting of at least one bonus music selection irrespective of user's playback request when said interactive data for authentication entered by the user disagrees with said approved interactive data for authentication stored in said digital video disc.

6. The decoding apparatus in accordance with claim 5, wherein said approved interactive data for authentication stored in said digital video disc is a password.

7. The decoding apparatus in accordance with claim 5, wherein said approved interactive data for authentication stored in said digital video disc is obtainable by paying for it.

8. The encoding apparatus in accordance with claim 5, wherein said approved interactive data for authentication stored in said digital video disc is an answer for a given inquiry.

* * * * *